Dec. 5, 1950 G. C. SZIKLAI 2,532,793

REFLEX AMPLIFICATION UTILIZING CAMERA TUBE

Filed Dec. 30, 1944 2 Sheets-Sheet 1

INVENTOR
GEORGE C. SZIKLAI
BY H. S. Grover.
ATTORNEY

REFLEX AMPLIFICATION UTILIZING CAMERA TUBE

Filed Dec. 30, 1944 2 Sheets-Sheet 2

INVENTOR
GEORGE C. SZIKLAI
BY H. S. Grover
ATTORNEY

Patented Dec. 5, 1950

2,532,793

UNITED STATES PATENT OFFICE 2,532,793

REFLEX AMPLIFICATION UTILIZING CAMERA TUBE

George C. Sziklai, Princeton, N. J., assignor to Radio Corporation of America, a corporation of Delaware Application December 30, 1944, Serial No. 570,664

7 Claims. (Cl. 178—7.2)

Figure 1:
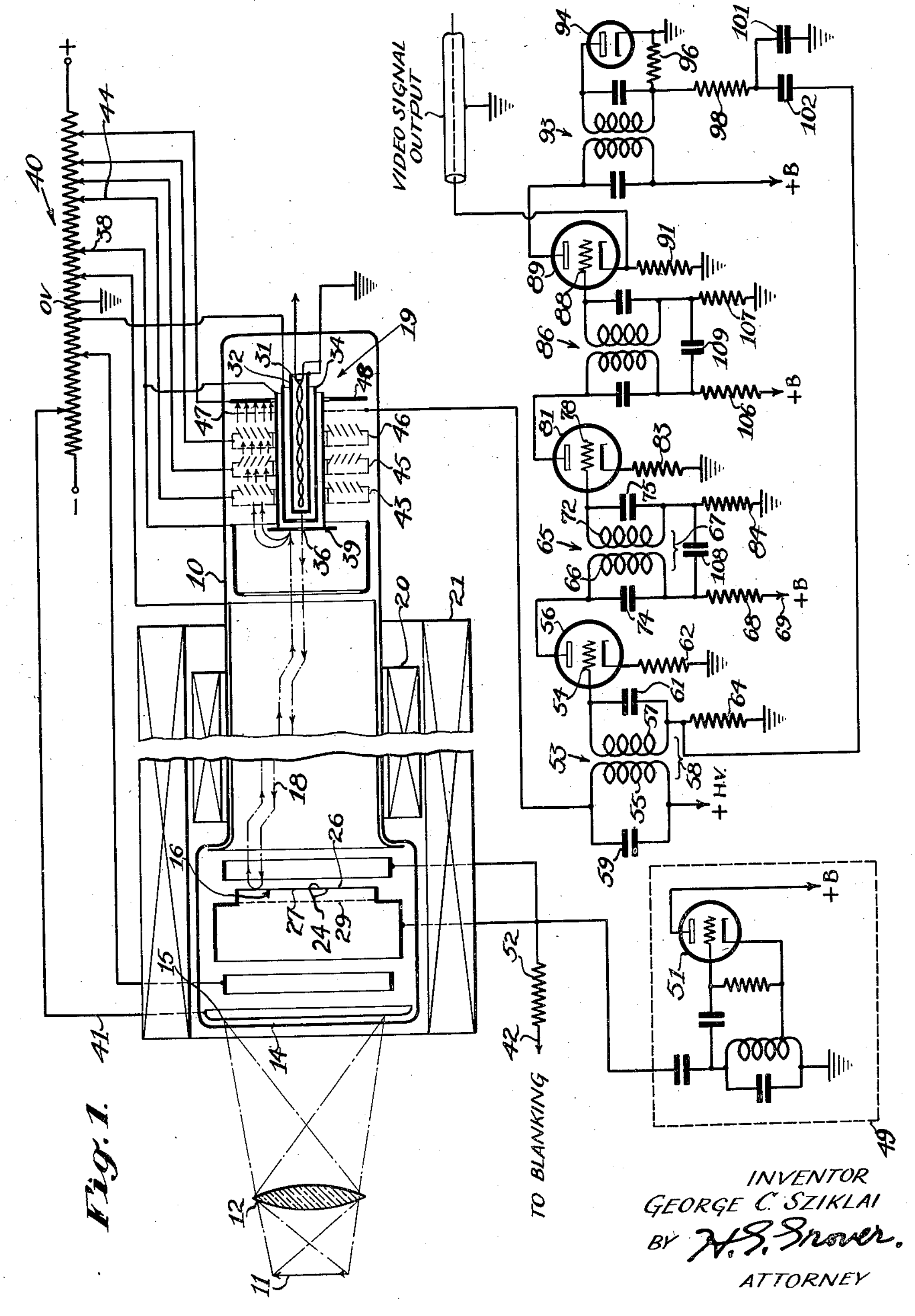

The present invention relates to a signal generator and amplifier, and more particularly to the generation and amplification of intelligence signals occupying a wide frequency band, such as television image signals.

The primary object of the present invention is to provide means for the generation and amplification of a wide band signal including high frequency components.

Another object is to provide a novel signal amplifier employing the reflex principle.

A further object is to provide a combined signal generator and reflex amplifier.

Still another object of the invention is to provide a novel image signal generating system in which a camera tube performs the dual function of scanning an image, object, or other subject matter to produce a carrier signal modulated by image scanning signals.

A still further object is to provide a novel image signal generating system in which a camera tube performs the dual function of scanning an image, object, or other subject matter to produce image signals and of producing a carrier signal which is modulated by the image signal.

A still further object is to provide a novel image signal generating system in which an electron image stream is interrupted periodically at a high frequency, thereby to produce an electron image which is scanned by a cathode ray beam, the result of the scanning being a secondary electron stream varying in accordance with the high frequency and also in accordance with frequencies representing the scanning of the electron image.

A still further object is to provide a novel image signal generating system in which a cathode ray beam is caused to vary at a relatively high frequency and at the same time to scan an electrostatic image so as to produce a secondary electron stream varying in accordance with the high frequency and also in accordance with frequencies representing the scanning of the electrostatic image.

A still further object is to provide a novel image signal generating system in which a cathode ray beam camera tube scans an image, object, or other subject matter to produce an image signal, the cathode ray beam of the camera tube being modulated at a frequency rate which is high with respect to the highest frequency of the image signal produced by the scanning process.

A still further object is to provide a novel image signal generating system in which a cathode ray beam camera tube of the type having secondary electron multiplying arrangements and wherein the electron beam is projected toward a target of the electrostatic charge storage type to be modulated in accordance with the electrostatic charges representative of an optical image and to be returned to the electron multiplying structure for amplification, is employed to scan an image, object, or other subject matter to produce an image signal, the cathode ray scanning beam of the camera tube being modulated with the image signal which is produced by the scanning process after the image signal has been amplified by action of the electron multiplier section of the tube and/or is further amplified by a vacuum tube amplifier.

A still further object of the present invention is to modulate a cathode ray scanning beam with signals of image frequency and an additional signal, the frequency of which is high as compared to the highest image signal frequency.

A still further object is to provide a novel arrangement for obtaining the image signal output from a television camera or scanning tube.

Figure 2:
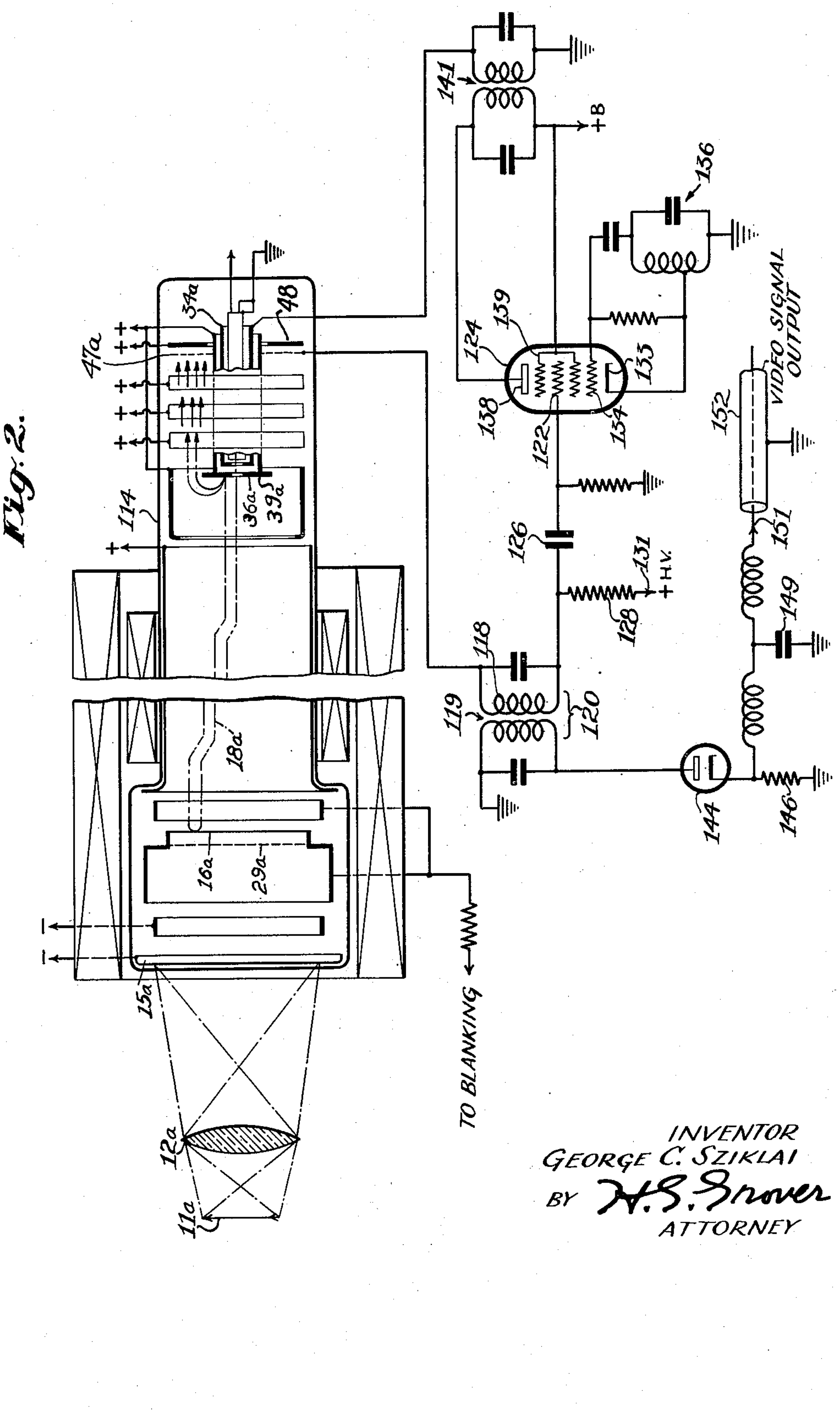

Other objects and advantages of the invention will, of course, become apparent and immediately suggest themselves to those skilled in the art to which the invention is directed from a reading of the following specification in connection with the accompanying drawings in which:

Fig. 1 is a diagrammatic showing of a television image pickup arrangement embodying the invention in one form; and Fig. 2 is similar to Fig. 1 and shows another embodiment of the invention.

Referring to Fig. 1, there is shown a camera tube 10 having a double sided mosaic, such as, for example, the high sensitivity low beam velocity type known as the "Image Orthicon" or the high beam velocity type known as the "Image Iconoscope," which is housed or supported in any suitable manner (not shown) so that light reflected from a scene or object 11 to be televised may be imaged by suitable optical means, such as a lens 12, upon the inside surface of the transparent tube end 14. The "Orthicon," shown herein by way of example, is of the image type disclosed and claimed in a copending application for Letters Patent of Albert Rose, Serial No. 407,132, filed August 16, 1941, now Patent No. 2,403,239, granted July 1, 1946. As in the Rose disclosure, the inside surface of the end wall 14 is coated or treated so as to provide a photo-cathode 15. An example of a photo-cathode taken from the patented art is shown in the U. S. patent granted September 3, 1940, to H. M. Iams, No. 2,213,547.

The image or camera tube 10 also includes a mosaic 16 which is to be scanned by a low velocity electron beam 18, produced by an electron gun 19. This organization of parts together with beam deflecting means of the combined electrostatic and electromagnetic type and a focusing coil are fully described in the copending application above referred to, and only those portions of the tube 10 which are necessary to a complete understanding of the invention will be described in detail herein. For the sake of completeness of illustration, Fig. 1 includes a schematic showing of a magnetic deflection yoke 20 having horizontal and vertical deflection coils. Also, a focusing coil 21 is shown.

The mosaic 16 is of the double sided type, for example of the type disclosed in the above noted copending application. An example from the patented art is described in a patent granted July 14, 1936, to W. Hickok, No. 2,047,369. This patented mosaic will be suitable if it is constructed to have a high secondary emission. The mosaic of the "Image Orthicon" shown comprises a thin sheet of glass 24 with resistivity so chosen as to permit charges on its two sides 26 and 27 to unite by conduction in a frame time. The glass target 24 is mounted close to a fine mesh signal screen 29 which collects secondary emission from the face 27 of the target 24 which is exposed to photo-electrons from the photo-cathode 15. It will be understood that the patent referred to immediately above is cited only as an example from the patented art of a mosaic electrode of this general type, and that the preferred construction is shown in the copending Rose application above referred to and briefly described herein.

The assembly of electrodes constituting the electron gun 19 includes a heater 31 and a cathode 32 from which electrons may be drawn, a control electrode or grid 34, and a first anode 36. The grid 34 is suitably biased and the first anode 36 is connected to a source of positive high potential 38. The magnitude of this potential may be 300 volts, but this is given solely by way of example and is illustrative of the operation of this anode in conjunction with other electrodes to be described in the performance of an electron multiplier function. A camera tube of the kind briefly described above having an electron multiplier is disclosed and claimed in a copending application of Paul K. Weimer, Serial No. 554,494, filed September 16, 1944, now U. S. Patent No. 2,433,941, granted January 6, 1948.

The tube 10 preferably, but not necessarily, includes an electron multiplier means. In the illustrative means, the first anode 36 acts as the first multiplier and is shaped as indicated at 39 to perform this function. To review briefly the operation of the tube 10, when light is incident on the photo-cathode 15 and, for the purpose of this discussion, upon a very small area thereof, photo-electrons will be emitted in proportion to the intensity of the incident light. The emission will also be proportional to the light intensity on the corresponding elemental area of the object which is to be scanned. Since there is photoelectric emission from each of the elemental areas over the element 15, the degree of such emission from any particular elemental area corresponds to the degree of light intensity to which it is exposed, and therefore, a current image or electron image stream is developed to produce an electrostatic image over the surface 27 of the mosaic 16. When the preferred form of mosaic in the form of a partly conducting glass target is used, it is insulated from other elements of the tube.

Suitable biasing voltages are provided for the elements of the tube 10, and, by way of example and for the sake of illustration, a potentiometer 40 is shown as providing biasing voltages. Specified connections to the potentiometer 40 will be given separate reference characters. The function of each individual element is fully discussed in the above noted Weimer application together with examples of suggested voltage values, to be applied to the elements. Only those tube elements directly concerned in the description of the present invention have been or will be discussed herein, it being remembered that tube 10 is shown by way of example.

Projection of the current image (electron image stream) is facilitated by maintaining the mosaic 16 positive with respect to the photo-cathode 15. For example, the photo-cathode may be connected to a source of negative biasing potential 41. This potential is indicated, solely by way of example, as having a value of 400 volts negative. Focusing of the current image may be obtained by an electro-magnetically produced field in accordance with the principles laid down in a patent to A. V. Bedford, No. 2,258,728, granted October 14, 1941, or by other suitable means. The means for producing the current image focusing field are shown schematically and are not relevant to a complete understanding of the invention. Secondary electrons emitted from the surface 27 are, in the normal operation of the tube 10, that is to say, when the tube 10 is not employed in the system of the present invention, collected by the screen 29. Also, the screen 29 may be employed as a blanking means by making use of the connection 42 to a source (not shown) of blanking signals.

The operating surface 26 of the mosaic 16 will have an electrostatic image which is a replica of that on the surface 27. Therefore, for a point on the photo-cathode which is highly illuminated, there will be a corresponding point on the face 26 which has a relatively high positive potential. Electrons in the beam 18, directed toward particles of the face 26, which are positive, will be collected by these particles; whereas, electrons approaching particles corresponding with an un-illuminated area of the photo-cathode 15, will be deflected from the mosaic and will reach the first anode 36 which also serves as a first multiplier. Those electrons impinging on the front portion 39 of the first anode 36 release a great number of secondary electrons which are drawn toward the second multiplier 43. This second mutliplier 43 is connected to a source 44 which is positive with respect to the source 38. The energy is similarly multiplied at the third, fourth, and fifth multipliers 45, 46, and 48, and the released electrons impinge upon a collector element 47. In normal operation of the tube 10, the image signal is taken from the collector 47 and is fed to a video pre-amplifier.

In accordance with the present invention, a carrier frequency is delivered to the tube 10 upon which the image signal is modulated, thereby enabling the use of the reflex principle in the pre-amplifier. To accomplish this, a high frequency is applied to the screen 29 from an oscillator 49 of any desired kind or type capable of producing high frequency. A simple grounded plate triode oscillator employing a tube 51 is shown illustratively.

Operation of the screen 29 when it is excited by the high frequency is as follows: At the peak of the positive half-cycle of the oscillator 49, the screen 29 will collect all of the secondary electrons which have been released from the face 27 due to electrons from the surface 15 reaching it at a velocity relatively high. The surfaces 26 and 27 will then assume positive charges, and during this time a large number of the electrons of the scanning beam 18 will be retained by the target 24 to restore an equilibrium condition. During peaks of the negative half-cycle of the oscillator 49, the tube 10 will operate in such a way that the electrons released at 27 will not be collected but will return to that surface. It will be noted that secondary electrons released from the face 27 of the target 24 will effectively flow in a circuit comprising a resistor 52 which ultimately is connected to ground or to a slightly positive potential. As shown in Fig. 1 of the drawings, the resistor 52 is connected to the above mentioned source of blanking signals which makes the screen 29 negative during the fly-back time of the scanning beam 18.

The effect of the high frequency voltage on the screen 29 is thus to chop the electron image current at a high frequency rate, and therefore, the signal appearing at the output electrode 47 will be in the nature of the high frequency carrier from the oscillator 49 modulated by the image signal.

This high frequency image modulated signal is then passed through a band pass filter 53 of the double tuned type to the grid 54 of a first amplifier tube 56. The primary 55 and the secondary 57 of the inter-stage transformer 58 are tuned by condensers 59 and 61, respectively, and the coupling between the transformer coils is such that the pass band obtained permits ready transmission of the frequency of the oscillator 49 together with the upper and lower side bands, representing the image signal modulation. A cathode resistor 62 provides a biasing voltage for the grid 54, the circuit of which is returned through a grid resistor 64. The plate circuit of the tube 56, which includes the primary 66 of a second inter-stage transformer 67, is connected through a voltage dropping resistor 68 to the usual plate supply source indicated at 69. The primary 66 and the secondary 72 of the inter-stage transformer 67 are tuned by condensers 74 and 75, respectively, so that the band pass filter 65, comprising the transformer 67, will have the characteristics of the band pass filter 53. The secondary 72 is connected to the grid 78 of a second amplifier tube 81, a biasing resistor 83 and a grid resistor 84 being included in the electrode circuits of this tube. The output of the vacuum tube 81 is fed through a third band pass filter 86 similar to the two previous band pass filters, to the grid 88 of a third amplifier tube 89. The cathode resistor 91 for the tube 89 serves an additional purpose, as will be later described.

The modulated high frequency output from the tube 89 is fed through a fourth band pass filter 93 across the secondary of which is connected a diode demodulator 94 having a D. C. load resistor 96. The image signal voltage is built up across a resistor 96. A resistor 98 in conjunction with a condenser 101 serves as a carrier filter.

The demodulated image signal is passed through a coupling condenser 102 to the grid 54 of the first amplifier tube 56. Since the secondary 57 of the band pass filter 53 is practically a short circuit for the relatively low frequency image signal, it will pass this reflex signal to the grid 54 substantially without attenuation. In the same fashion, the band pass filters 65 and 86 will appear as non-existent impedances for the amplified image signals appearing across the resistors 64, 68, 84, 106, and 107, connected in series with these band pass filters.

Signal transfer at image signal frequencies is obtained between the plate of the tube 56 and the grid of the tube 81 by way of a coupling condenser 108. Likewise, signal transfer in the image signal range from the tube 81 to the tube 89 is obtained by a coupling condenser 109. These condensers are inserted to insure maximum transfer of the lower frequencies appearing in the video signal.

The video signal, which is in effect twice amplified, may be taken off from the resistor 91 in which case the tube 89 acts as a cathode follower for the image frequency signal, while, for the modulated signal, it provides full gain. Due to the fact that the final tube 89 contributes a gain once, while without reflexing in accordance with the invention it would not do so, the actual gain may be higher than the square of the gain which would be obtained if the tube were used once only in the conventional manner.

Another advantage, among other advantages, of the reflex system for signal amplification just described is that since the amplification of the image signal frequencies is taking place at high and therefore noise overriding signal levels, the system is comparatively free from microphonics, spurious signal pickup, and other ill effects of that nature. The amplification, in accordance with this invention, obtained by modulating an electron stream, is obtained without undue phase shift of the frequency components.

Fig. 2 of the drawings shows a modification of the arrangement just described in which signal conversion or mixing is resorted to to obtain the image signal modulated high frequency carrier.

The camera tube 114 is or may be similar to the camera tube 10 of Fig. 1 of the drawings. An image of a scene 11a or other subject matter to be converted to image signals is projected by a lens 12a onto the photo-cathode of the tube 114. The screen 29a is maintained positive and collects secondary electrons, and therefore, the photo-cathode 15a and the mosaic or target 16a cooperate in the usual manner at all times except that the screen 29a may be used for blanking in the manner above explained in connection with Fig. 1 of the drawings.

The scanning beam 18a is directed toward the target 16a so that electrons in the beam may land at low or zero velocity from a direction normal to the target on portions of the target which are positive. Negatively charged portions of the target 16a will deflect beam electrons to the first electron multiplier section 39a of the first anode 36a.

While the image multiplier section of the tube 10 is advantageous in the arrangement of Fig. 1, in the tube 114 of Fig. 2, it is utilized in a novel manner to assist in obtaining the advantages of reflex amplification. The tube 114 comprises a collector element 47a from which the image signal is taken by way of the tuned primary 118 of a band pass filter 119 which comprises an inter-stage transformer 120. The image signal obtained over this path is coupled to the grid 122 of a mixer tube 124 by way of a coupling condenser 126. The resistor 128 serves as a coupling resistor and also serves as a connection for the collector element 47a to a source of high positive potential, indicated at 131. The cathode 133 and the first grid 134 of the tube 124 are connected to an oscillating circuit 136 so that this section of the tube acts as an oscillator in conjunction with its screen grid 138 to generate a high frequency signal. The primary 118 of the band pass filter appears to be short circuited so far as the image frequency signal is concerned.

The mixer tube 124 converts the image frequency signal into an image signal modulated high frequency signal which is separated by a band pass filter 141, and which is fed to the grid 34a of the tube 114. The scanning beam 18a is modulated by the image signal modulated high frequency signal applied to the grid of the electron gun.

Due to the high multiplier gain in the electron multiplier section of the tube 114, the modulated signal is amplified and this amplified signal is then applied through the band pass filter 119 to an image frequency detector 144. The image frequency signal developed across the load resistor 146 of the detector tube 144 is filtered by a low pass T section filter 149. The image signal appears at a high level of amplification in an output terminal or connection 151, and may be fed by a cable 152 or other communication circuit to subsequent apparatus of any desired nature.

The filters, amplifiers, detectors, oscillators and/or the mixer stage are shown herein by way of example. It will appear, after a study of the invention disclosed herein, that any known types of such devices may be employed in the novel systems of the invention.

Various modifications of the invention shown and described herein by way of example are possible without departing from the spirit and scope of the described invention, and it is desired that any and all such modifications be considered within the purview of the present invention defined by the hereinafter appended claims.

Having now described the invention, what is claimed and desired to be secured by Letters Patent is the following:

1. A system for deriving a signal having image intelligence, the derived signal being suitable for amplification, comprising means having a deflectable cathode ray beam to scan an image for the purpose of obtaining output image signals, means to generate a carrier wave, means to mix said image signals and said carrier wave to obtain an image modulated carrier signal, means to modulate said cathode ray beam with said image modulated carrier signal, means for releasing electrons from said beam in accordance with the image being scanned, and secondary electron multiplying means for multiplying the electrons released from said beam.

2. A system for deriving and amplifying output image signals comprising means to scan an image for the purpose of deriving output image signals, means to cause said scanning means to provide a high frequency effect, means to cause said output image signals to modulate said high frequency effect to produce an image modulated carrier signal, means for multiplying said carrier signal, a reflex amplifier having an input circuit and two output circuits, and means to feed said multiplied carrier signal to said amplifier input circuit.

3. A system for deriving a signal having image intelligence, the derived signal being suitable for amplification, comprising means to scan an image for the purpose of obtaining output image signals, means to generate a carrier wave, means associated with said scanning means for modulating said carrier wave by said output image signals, means associated with said scanning means for multiplying said modulated carrier wave, and an amplifier for amplifying said multiplied carrier wave, said amplifier having means for reamplifying said output image signals.

4. A signal generating system employing a cathode ray beam camera tube having an electron multiplying arrangement for providing output image signals, a target of the electrostatic charge storage type, means for projecting an electron beam toward the target, means to cause the beam to scan the target and thereby to be modulated in accordance with electrostatic charges representative of an optical image, means to return the modulated beam to the electron multiplying arrangement serving as a means to amplify the output image signals, and means to modulate said scanning beam with the previously amplified output image signals.

5. An image signal generating system employing a cathode ray beam camera tube having an electron multiplying arrangement, a target of the electrostatic charge storage type, means for projecting an electron beam toward the target, means to cause the beam to scan the target and thereby to be modulated in accordance with electrostatic charges representative of an optical image, means to return the modulated beam to the electron multiplying arrangement for amplification, the electron multiplying arrangement serving as a means to amplify the output image signals, means to produce a high frequency signal, means to modulate the output image signals on the high frequency signal, means to modulate said scanning beam with the modulated high frequency signal so that the electron multiplying arrangement serves to amplify the modulated high frequency signal, and detector means to recover the output image signals from the high frequency signal.

6. The method for obtaining high level output signals from a cathode ray beam camera tube having a multiplier for its beam, which comprises, generating an image frequency signal representative of an electrostatic image on the target of said tube, generating a carrier frequency which is high with respect to the highest image frequency, modulating said carrier by said image frequency signal, modulating the cathode ray beam by said modulated carrier, multiplying said modulated beam in the multiplier section of said tube, and demodulating the output of said tube to obtain the image frequency signal at a high energy level.

7. The method according to claim 6 including the step of multiplying the image frequency signal in the multiplier section of said tube prior to modulating the carrier by said image frequency signal.

GEORGE C. SZIKLAI.

REFERENCES CITED

The following references are of record in the file of this patent:

UNITED STATES PATENTS

| Number | Name | Date |
|---|---|---|
| 2,205,243 | Dome | June 18, 1940 |
| 2,213,547 | Iams | Sept. 3, 1940 |
| 2,220,977 | Seeley | Nov. 12, 1940 |
| 2,234,691 | Dome | Mar. 11, 1941 |
| 2,241,204 | Keyston | May 6, 1941 |
| 2,288,402 | Iams | June 30, 1942 |
| 2,301,820 | Schlessinger | Nov. 10, 1942 |
| 2,304,091 | Hergenrother | Dec. 8, 1942 |
| 2,307,209 | George | Jan. 5, 1943 |

FOREIGN PATENTS

| Number | Country | Date |
|---|---|---|
| 791,778 | France | Dec. 17, 1935 |
| 505,453 | Great Britain | May 11, 1939 |
| 103,411 | Australia | Mar. 3, 1938 |

OTHER REFERENCES

Proc., I. R. E., vol. 30, Jan. 1942, page 4.

Proc., I. R. E., vol. 30, Jan. 1940, page 4.